2,745,742

METHOD OF MAKING A SINTERED BRAZING PELLET

Alfred T. Gaskill, Cleveland Heights, Ohio, assignor to General Electric Company, a corporation of New York; patent dedicated to the Public insofar as it relates to lamps and lamp parts to the extent stated in document recorded in the United States Patent Office, January 4, 1954, liber U-238, page 394

No Drawing. Application March 8, 1952,
Serial No. 275,670

4 Claims. (Cl. 75—211)

My invention relates in general to a brazing pellet and to a method of manufacture thereof. More particularly, my invention relates to a brazing pellet comprising a pressed and sintered body composed of a powder mixture of a brazing metal and a flux material.

There are certain brazing applications in present day high-production manufacturing processes which are particularly suited to the automatic feeding of the brazing and flux materials to the work, in accurately controlled quantities, in the form of sintered masses or pellets of such materials, as where one of the parts to be brazed is in the form of a receptacle or is provided with a cavity into which the pellets may be fed by the automatic feeding mechanism. An example of such a brazing application is the brazing of the lead-in wires of a sealed beam type of incandescent lamp to the interiors of the thimble terminal contacts of such a lamp, as illustrated for instance in U. S. Patent 2,317,031 to C. A. Cotman, dated April 20, 1943.

To assure proper feeding of such sintered brazing pellets by the automatic feeding mechanism, it is necessary that the pellets not only be of uniformly alike size and shape but that they also possess adequate strength or resistance against crumbling.

It is an object of my invention, therefore, to provide a sintered brazing pellet composed of powdered brazing and flux materials and which is highly resistant to crumbling and of controlled size and shape.

Another object of my invention is to provide a novel method of making sintered brazing pellets of the above-mentioned character.

According to one aspect of the invention, sintered brazing pellets which are highly resistant to crumbling and are of uniform size and shape are formed by thoroughly intermixing a powdered brass solder material, the powder particles of which are of a size less than approximately 70 mesh, with a powdered flux material consisting of a relatively low melting point high borate glass having a particle size less than 70 mesh, then pressing measured quantities of the powder mixture into pellets of predetermined size and shape, and then sintering the pressed pellets at a temperature and for a period of time sufficient to bond the powder particles together into a firmly coherent mass. According to a further aspect of the invention, the powdered brass solder and the powdered flux material are present in the admixture in amounts by weight ranging from approximately 87 to 93 per cent of brass solder powder and approximately 7 to 12 per cent by weight of flux powder.

The brazing pellets according to the invention comprise a pressed and sintered powder mass composed of a powder mixture comprising a brass solder, a powdered flux mixture, and preferably, in addition, a powdered lubricant. The brass solder material may be any brass alloy conventionally employed for brazing purposes. The brass solder preferably, employed, however, is an alloy consisting essentially of approximately 47 to 60 per cent by weight of copper and approximately 40 to 50 per cent by weight of zinc, with varying minor percentages of other ingredients such as tin, iron, silicon, manganese and lead. An example of a brass alloy composition which has been found to be particularly suitable for the purpose of the invention is as follows:

| | Percent |
|---|---|
| Copper | 56.00–59.00 |
| Tin | 0.75–1.10 |
| Iron | 0.75–1.25 |
| Manganese | 0.01–0.08 |
| Silicon | 0.04–0.14 |
| Lead _____max__ | 0.10 |
| Zinc | Balance |

To secure maximum strength or resistance to crumbling in the final sintered products, the brass solder powder employed is preferably one produced by a metal-disintegrating process which results in the formation of powder particles predominantly having a highly irregular or rough surface, with surface cavities and flaky and acicular projections. The surface cavities and projections on such rough-surfaced powder particles apparently provide gripping surfaces which cause the powder particles to more or less interlock with one another and with the particles of flux material when the powder mixture is pressed into a pellet and sintered, thereby insuring a better holding together of the powder particles in the final sintered product.

The powdered flux material which is employed in the brazing pellet according to the invention is preferably of the so-called borax type and comprises a powdered high-borate glass having a relatively low melting point of less than 650° C. and preferably of the order of 600° C. or less. For the purposes of the invention, the borate glass may be one consisting of the melted product of a mixture of borax and feldspar in proportions of the order of from 1 to 3 parts by weight of borax to 1 part by weight of feldspar. However, the preferred glass flux composition, i. e., the one having the maximum degree of fluxing activity without excessive and objectionable hygroscopicity, is one consisting of the melted product of a mixture of borax and feldspar in proportions of the order of 2 parts by weight of borax to 1 part by weight of feldspar. The borax and feldspar ingredients are mixed and melted in a furnace to form a glass. The solidified glass is then broken into chunks and formed into a powder of accurately controlled particle size by grinding and sifting operations.

In order to produce brazing pellets which are highly resistant to crumbling or disintegration and are of adequate strength to permit satisfactory feeding thereof by automatic feeding mechanisms, it is essential that the flux particles be of a maximum size no greater than approximately 70 mesh. By keeping the particle size of the powdered flux material within such a maximum size limit, I have found that the average crushing strength of the finished pellet is very much higher than, i. e., around twice, that of a pellet made without such a flux particle size limitation. In addition, the lowest strength exhibited by any pellet in which the flux particle size is maintained within the above-specified 70 mesh limit is increased a minimum of around three times over the lowest strength exhibited by any pellet in which the flux particles are not so maintained within the above-mentioned fineness limitation.

While it is not as important to pellet strength to keep the powdered brass solder within a maximum particle size limitation such as required for the flux powder, nevertheless I have found it best to do so in order to assure a homogeneous distribution of the brass solder and flux particles in the finished pellet. For such reason, it is preferred to employ a brass solder powder having only a very minor proportion or none of the particles thereof of a size greater than approximately 70 mesh or thereabouts, and in which at least 50 per cent or so of the total powder content thereof is of a particle size less than 200 mesh. However, the presence in the brass solder powder of too great a percentage of extremely fine particles, such as 325 mesh and finer, is objectionable because it prevents the brass solder and flux powder mixture from which the pellets are formed from flowing freely into the pellet-forming dies and in addition gums up the dies. For such reason it is preferable to employ a brass solder powder of which at least 25 per cent or so of the total particle content thereof is of a size greater than 200 mesh but less than 70 mesh. The sieve analysis of a specific example of a brass solder powder which has been found to be particularly suitable for the purposes of the invention is as follows:

*Brass powder sieve analysis*

| Screen size: | Percent |
| --- | --- |
| Greater than 70 | 0.3 |
| Greater than 100 | 1.7 |
| Greater than 140 | 11.2 |
| Greater than 200 | 15.8 |
| Through 200 | 71.0 |

In forming the brazing pellets according to the invention, a powder mixture is first prepared of the brass solder material and the flux material in the proportions of approximately 88 to 93 per cent by weight of powdered brass solder and approximately 7 to 12 per cent by weight of powdered flux. As pointed out hereinafter, care must be taken to see that the powdered borate glass flux material is thoroughly dry before it is mixed with the powdered brass solder. Measured quantities of the powder mixture are then pressed into formed bodies of pellets of predetermined size and shape in a die cavity, under high pressure of the order of thousands of pounds. The measuring of the individual charges of powder mixture for each pellet may be performed by automatic measuring means, and the pressing of the powder charges into pellets may also be performed by a conventional type automatic pressing machine. The pressed bodies or pellets may be of any desired size and shape or form depending upon the particular brazing application for which they are intended. Thus, they may be in the form of solid pellets of spherical, square, rod or any other desired shape, or a hollow pellet or bead in the shape of a ring or any other formed section. For the particular lamp lead-in wire brazing application referred to above, the pellets conveniently may be in the form of a small cylindrical rod of approximately ⅛ inch diameter by ⅛ inch long.

In order to lubricate the punches and dies of the pellet brazing machine so as to avoid excessive wear thereon by the abrasive action of the granulated brass and glass mixture, it is desirable to incorporate a small amount of a powdered lubricant in the powder mixture. As a suitable material for such purpose, use may be made of a refined hydrogenated vegetable oil in powdered form, particularly a powdered stearate such as that commercially known as "Sterotex." The amount of the powdered lubricant material ordinarily required in the powder mixture to satisfactorily perform its lubricating function is very small, amounting in most cases to a fraction of one per cent or so by weight of the total mixture. Thus, powder mixtures which have been found to be entirely satisfactory for the purposes of the invention are as follows:

| | Percent by weight |
| --- | --- |
| Brass solder | 88 to 93 |
| Borate glass flux | 7 to 12 |
| Hydrogenated vegetable oil | 0.5 |

A specific example of a powder mixture which has been found to be particularly advantageous is as follows:

| | Percent by weight |
| --- | --- |
| Brass solder | 91.5 |
| Borate glass flux | 8.0 |
| Sterotex | 0.5 |

After forming the powder mixture into pellets, the latter are then sintered at a suitable temperature and for a period of time sufficient to soften the glass particles to the point where they become just tacky enough to bond the powder particles together into a firm and coherent hard mass. The sintering of the pellets may be accomplished by placing them on a conveyor belt moving through a suitable heated oven, such as a muffle type furnace. Satisfactory sintering of the pellets may be obtained by subjecting them to a temperature in the sintering oven of from approximately 550–700° C. for a period of at least one minute and up to 3 minutes or so. For best results, however, I prefer to sinter the pellets at a temperature of approximately 600° C. or less for a period of approximately 1½ minutes.

The powdered borate glass flux materials which are used in the manufacture of the pellet according to the invention are considerably hygroscopic, and I have found that if they are in a moist state at the time the pellets are sintered the pellets will swell out of shape and size and crack upon being sintered, thereby resulting in high shrinkage or production rejections as well as preventing the production of pellets of uniformly alike size and shape such as is necessary for satisfactory use with automatic pellet-feeding mechanism. For this reason, therefore, it is essential to the maintenance of control over the size and shape of the final sintered pellet that the powdered borate glass flux material be in a thoroughly dry state at the time of sintering of the pellets. This condition is preferably obtained by seeing to it that the borate glass flux powder is in a thoroughly dry condition at the time of mixture thereof with the other powder components of the pellet-forming admixture, and thereafter processing the prepared mixture into pellets and sintering the so-formed pellets without too great a lapse of time between the mixture preparation step and the final sintering of the pellets, and without exposing the prepared mixture or the unsintered pellets to an excessively moist surrounding atmosphere.

What I claim as new and desire to secure by Letters Patent of the United States is:

1. The method of making a hard sintered brazing pellet of uniform size and high resistance to crumbling which comprises thoroughly drying a quantity of powdered flux material having a fineness of at least 70 mesh and consisting of a relatively low melting point borate glass, admixing said powdered flux material with a powdered brass solder having a fineness of at least 70 mesh and the particles of which predominantly have a highly irregular rough surface characterized by acicular projections, pressing a measured quantity of the admixture into a pellet of predetermined size and shape, and sintering the pressed pellet into a firmly coherent mass.

2. The method of making a hard sintered brazing pellet of uniform size and high resistance to crumbling which comprises thoroughly drying a powdered flux material having a fineness of at least 70 mesh and consisting of a borate glass having a relatively low melting point of the order of 600° C. or less, intermixing with said powdered flux material a powdered brass solder having a fineness of at least 70 mesh and the particles of which predominantly have a rough surface with flaky and acicular projections, said powder material being present in the admixture in amounts ranging by weight from approximately 88 to 93 percent of brass solder powder and approximately 7 to 12 percent of flux powder, pressing a measured quantity of the admixture into a pellet of predetermined size and shape, and sintering the pressed pellets at a temperature ranging from 550 to 700° C. for a period of at least approximately one minute to thereby firmly bond the powdered particles together.

3. The method of making a hard sintered brazing pellet of uniform size and high resistance to crumbling which comprises thoroughly drying a powdered flux material having a fineness of at least 70 mesh and consisting of a borate glass having a relatively low melting point of the order of 600° C. or less, thoroughly intermixing with said powdered flux material a powdered brass solder having a fineness of at least 70 mesh and the particles of which predominantly have a rough surface with flaky and acicular projections and a powdered hydrogenated vegetable oil lubricant, said powdered material being present in the admixture in amounts ranging by weight from approximately 88 to 93 percent of brass solder powder, approximately 7 to 12 percent of flux powder, and a few tenths of one percent of powdered vegetable oil, pressing a measured quantity of the admixture into a pellet of predetermined size and shape, and sintering the pressed pellet at a temperature ranging from approximately 550 to 700° C. for a period of at least approximately one minute to thereby firmly bond the powder particles together.

4. The method of making a hard sintered brazing pellet of uniform size and high resistance to crumbling which comprises thoroughly drying a powdered flux material composed of the melted product of a mixture of the order of two parts by weight of borax to one part by weight of feldspar and the powder particles of which has a fineness of at least 70 mesh, thoroughly intermixing with said powdered flux material a powdered brass alloy consisting essentially of approximately 47 to 60 percent by weight of copper and approximately 40 to 50 percent by weight of zinc and the powdered particles of which have a fineness of at least 70 mesh and are predominantly characterized by a rough surface with flaky and acicular projections and a powdered stearate, said powdered materials being present in the admixture in amounts ranging by weight from approximately 88 to 93 percent of brass alloy powder, approximately 7 to 12 percent of flux powder, and a few tenths of one percent of powdered stearate, pressing a measured quantity of the admixture into a pellet of predetermined size and shape, and sintering the pressed pellet at a temperature ranging from approximately 550 to 700° C. for a period of at least approximately one minute to thereby firmly bond the powder particles together.

References Cited in the file of this patent

UNITED STATES PATENTS

| | | |
|---|---|---|
| 1,291,878 | Hess | June 21, 1919 |
| 1,790,918 | Hauser | Feb. 3, 1931 |
| 1,891,546 | Krembs | Dec. 20, 1932 |
| 1,972,463 | Schlecht | Sept. 4, 1934 |
| 1,980,927 | Parker | Nov. 13, 1934 |
| 2,097,671 | Koehring | Nov. 2, 1937 |
| 2,121,194 | Hardy | June 21, 1938 |
| 2,196,875 | Sandler et al. | Apr. 9, 1940 |
| 2,317,031 | Cotman | Apr. 20, 1943 |
| 2,415,036 | Quinn | Jan. 28, 1947 |

FOREIGN PATENTS

| | | |
|---|---|---|
| 646,377 | Great Britain | Nov. 22, 1950 |

OTHER REFERENCES

Goetzel: "Treatise on Powder Metallurgy," vol. 1, New York, Interscience, 1949, pages 89 and 90.